E. ERIK.
TIRE VALVE.
APPLICATION FILED OCT. 22, 1921.
1,426,721.
Patented Aug. 22, 1922.
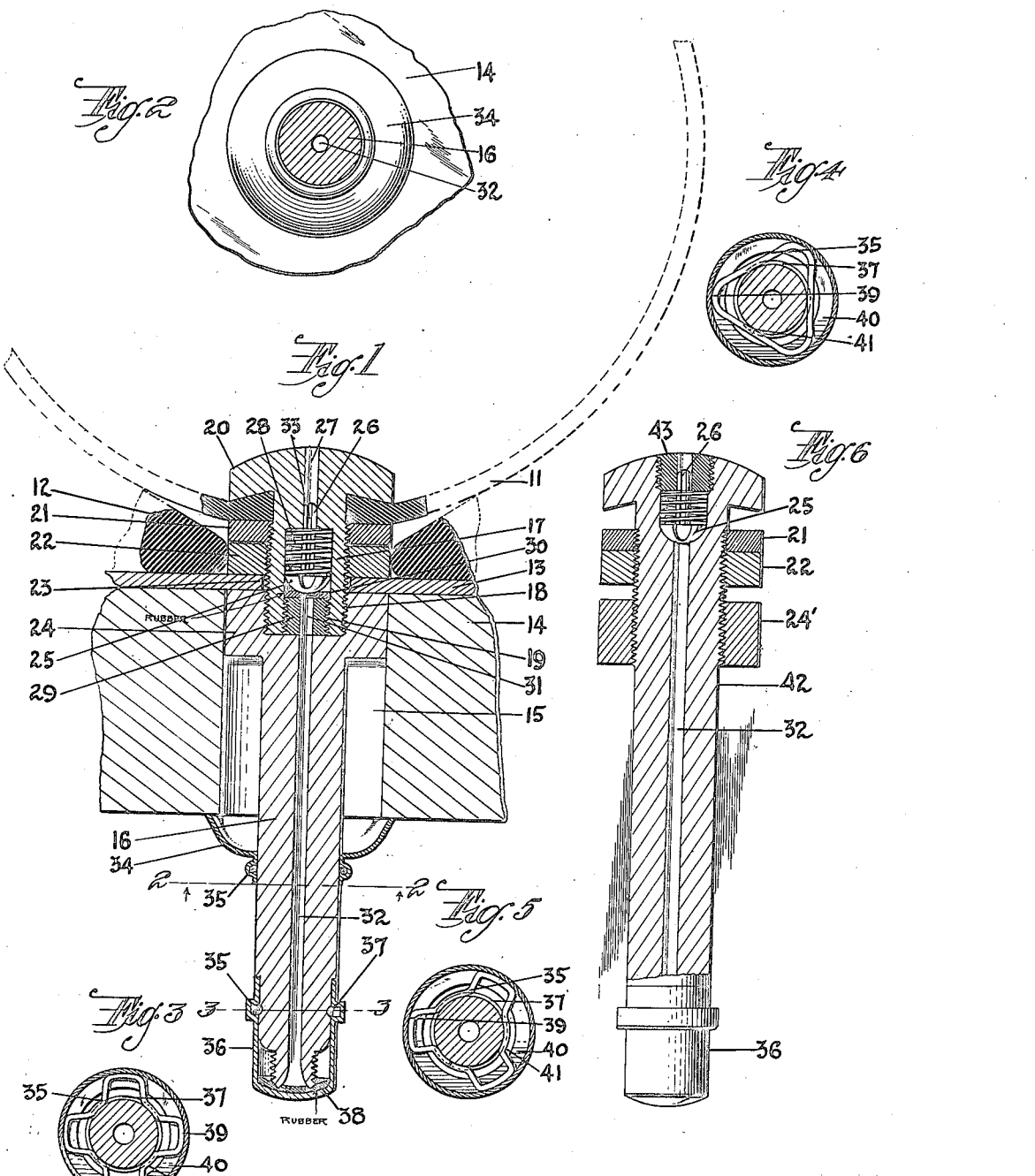
INVENTOR
EMIL ERIK
BY
*Antum Middleton*
ATTORNEY

UNITED STATES PATENT OFFICE.

EMIL ERIK, OF OSSINING, NEW YORK, ASSIGNOR OF ONE-FOURTH TO BARNEY PINDEK AND ONE-FOURTH TO ISADOR PINDEK, BOTH OF BROOKLYN, NEW YORK.

TIRE VALVE.

1,426,721.          Specification of Letters Patent.     Patented Aug. 22, 1922.

Application filed October 22, 1921. Serial No. 509,624.

*To all whom it may concern:*

Be it known that I, EMIL ERIK, a citizen of the United States, residing at Ossining, New York, have invented certain new and useful Improvements in Tire Valves, of which the following is a specification.

This invention relates to tire valves for pneumatic tires and its object is to devise a valve which is simple in construction, cheap to make, and yet highly efficient in operation so to that end, my invention consists essentially in a non-threaded valve stem having quick detachable means thereon for closing the aperture in the felloe through which the stem is adapted to pass and it consists further in a quick detachable cap for the end of the stem which has combined anti-rattling means and sealing means for the end of the stem. The invention further consists in a general simplification of the parts going to make up the completed valve stem.

I have chosen one embodiment of my invention for the purpose of illustration but it is to be understood that it is shown in an illustrative sense only and not a limiting one for the invention is capable of a number of different embodiments.

The chosen embodiment has been illustrated in the accompanying drawings in which—

Figure 1 is a vertical sectional view through the valve and partially through the felloe rim, tire and tube with which the valve is associated;

Fig. 2 is a transverse sectional view taken along the lines 2—2 of Fig. 1;

Figs. 3, 4 and 5 are modified forms of the fastening means for fastening the cap or closure to the non-threaded valve stem;

Fig. 6 is a modified form of valve.

My new valve is attachable to the usual inner tube 11 of a tire 12 carried by a rim 13 on a felloe 14 which has an aperture 15 therethrough, through which a valve stem 16 is adapted to pass.

Through the tube 11 I pass the valve chamber 17 of my valve which is threaded externally at 18 and internally at 19 and I provide a head 20 on the valve within the tube. On the outside of the valve chamber 17 I provide a nut 21 for clamping the tube between it and the head 20 and I provide a further spacing nut 22 which is adapted to bear against the rim 13 and to give support to the valve from the rim. The valve chamber 17 is adapted to pass through an aperture 23 in the rim and to have secured to it below the rim the valve stem 16 which has an enlarged head 24 adapted to bear against the rim 22 to further clamp the valve in position.

Within the valve chamber I provide valve 25 substantially cruciform in cross section provided with a stem 26 extending into an aperture 27 in the head 20 to guide the valve in its longitudinal operation. A spring 28 is provided to assist the valve to remain seated on its valve seat 29 adapted to be screwed interiorly into the valve chamber 17. The valve seat is preferably provided with a resilient gasket 30. The valve seat 29 is apertured at 31, which aperture is aligned with the aperture 27 in the valve head and the aperture 32 in the valve stem 16.

In operation, when the pump is operatively screwed to the valve stem 16, the pressure from the pump unseats the valve 25 and lets the air pass therearound through the channels 33 in the valve stem 26 through the aperture 27 into the tube. At the moment pressure from the pump ceases the air pressure in the tube and the pressure of the spring 28 causes the valve to seat.

As it is desirable to prevent the entry of mud and water, or both into the aperture 15 in the felloe 14 I provide a closure 34 for this aperture by attaching it to the stem 16 by means of a quick detachable element 35 hereinafter described which frictionally engages the stem 16 to hold the closure 34 in place. In the event that any water or mud should get by the closure 34 and into the felloe aperture 15, the construction of the valve stem by means of its head 24 is such that the water or mud cannot possibly get into the valve chamber.

On the end of the valve stem, I provide a cap 36 arranged to be flushed with the periphery of the valve stem 16 and it is also held in position by means of a quick detachable fastening 35 engaging with a groove 37 on the valve stem. 38 represents a resilient washer or gasket in the top of the cap 36 adapted to be pressed against the end of the valve stem 16 where it serves the double purpose of sealing the aperture 32 of the valve stem 16 and puts tension on the fastener 35 to prevent it from rattling.

The fastening 35 is essentially a deformed split ring 35 having its deformations substantially crenellated with its outwardly extending crenellations 39 extending into a groove 40 in the cap 36, or in the closure 34, and with the inwardly extending crenellations 41 frictionally engaging the tire stem 16 (in the case of the closure 34) or engaging the groove 37 in the tire stem in the case of the cap 36. This provides a quick detachable means whereby the cap 36 or the closure 34, will be tightly held in position on the valve stem 16 and yet shall render them readily removable from the stem. Figs. 4 and 5 show the crenellations simply modified as to number and form shown in Fig. 4 illustrates how the fastener 35 could be made triangular in shape and still serve the purpose.

In the form shown in Fig. 6 the valve chamber may be modified in that it is formed integrally with member 42 which comprises the valve head and stem. The valve seat is integrally formed in the member 42 and the valve is held in place by an apertured plug 43 secured within the valve head. The nuts 21 and 22 are applied as in the form shown in Fig. 1 but the integral nut 24 is replaced by a separate nut 24'.

It will thus be seen that I have devised a very simple valve having a minimum of parts so that it is very cheap to make and not likely to get out of order. At the same time it carries a closure member for the felloe aperture and for the cap which renders unnecessary the usual screwing on of these elements.

What I claim is:

1. In combination with a tire valve having a stem, a cap for the end of the stem, spring means for securing the cap directly to the stem, and resilient means in the cap bearing against said stem to maintain tension on said spring means.

2. In combination with a tire valve having a stem, a protective closure for the end of the stem, channelled means on said closure, and a castellated element extending into said channel for locking the closure to said stem.

3. In combination with a tire valve having a stem, a protective closure for the end of the stem, channelled means on said closure, and an element extending alternately into and out of said channel means for locking the closure to said stem.

In testimony whereof I have affixed my signature to this specification.

EMIL ERIK.